Nov. 24, 1959 H. B. SEDGFIELD 2,913,907
GYROSCOPIC APPARATUS
Filed Jan. 23, 1958 4 Sheets-Sheet 4

INVENTOR
HUGH B. SEDGFIELD
BY
ATTORNEY

//  # United States Patent Office

2,913,907
GYROSCOPIC APPARATUS

Hugh Brougham Sedgfield, Esher, England, assignor to The Sperry Gyroscope Company Limited, Brentford, Middlesex, England, a company of Great Britain Application January 23, 1958, Serial No. 710,820

Claims priority, application Great Britain February 7, 1957

13 Claims. (Cl. 74—5.41)

This invention relates to gyroscopes of the kind in which the gyroscope rotor is carried in a sealed bearing case which has two degrees of angular freedom and is enclosed in a container filled with liquid of such specific gravity as buoyantly to support the rotor bearing case and its contents in substantially neutral equilibrium against gravitational and inertia forces.

In the past gyroscopes of the kind specified have been provided with a gimbal ring and bearings which served, on the one hand, to restrain the rotor case against rotation around the spin axis of the rotor, and, on the other hand, to define the positions of two gimbal axes about which angular displacements of the rotor bearing case could be measured. Difficulties have arisen in supporting the gimbal ring, and maintaining it in its correct position in a manner that will avoid or minimise precession of the gyroscope. Such precession may arise from frictional torques about the gimbal axes, unbalance of the gimbal ring about the outer gimbal axis, unbalance of the rotor bearing case and contents about the two gimbal axes, or cross coupling between angular motions about the two gimbal axes. Cross coupling effects have been found to exist because relative angular movements of the bearing case and container about one axis (even the very small movements which are all that exist when the container is servo controlled to follow the bearing casing) tend to produce movements in the supporting liquid in the container, and these tend to react on the rotor case, or on the gimbal ring, or both, and thus apply torques to the rotor case about both gimbal axes.

According to the present invention, a gyroscope of the kind specified has means for maintaining a point which is fixed in relation to the rotor bearing case substantially in coincidence with a point which is fixed in relation to the container comprising one or more spherically formed surfaces provided on the rotor bearing case co-centrally with the said fixed point of the rotor bearing case, and means for causing the supporting liquid to flow into the space between the outer container and the said surfaces in a manner such that the forces exerted by the liquid on the said surfaces tend to increase, on any side of the rotor bearing case as that side approaches more nearly the adjacent part of the container whereby the forces exerted on the said surfaces of the rotor bearing case by the flowing liquid tend to maintain the fixed points of the rotor bearing case and the container in coincidence.

According to another aspect of the invention the rotor bearing case has hydrodynamic means utilising the flow of the supporting liquid to prevent relative rotation between the rotor bearing case and the container while leaving the rotor bearing case free to rotate relatively about axes perpendicular to the rotor axis.

In order that the invention may be clearly understood and readily carried into effect, a mercury floated gyroscope embodying the invention will now be described by way of example only, with reference to the accompanying drawings.

Figure 1:
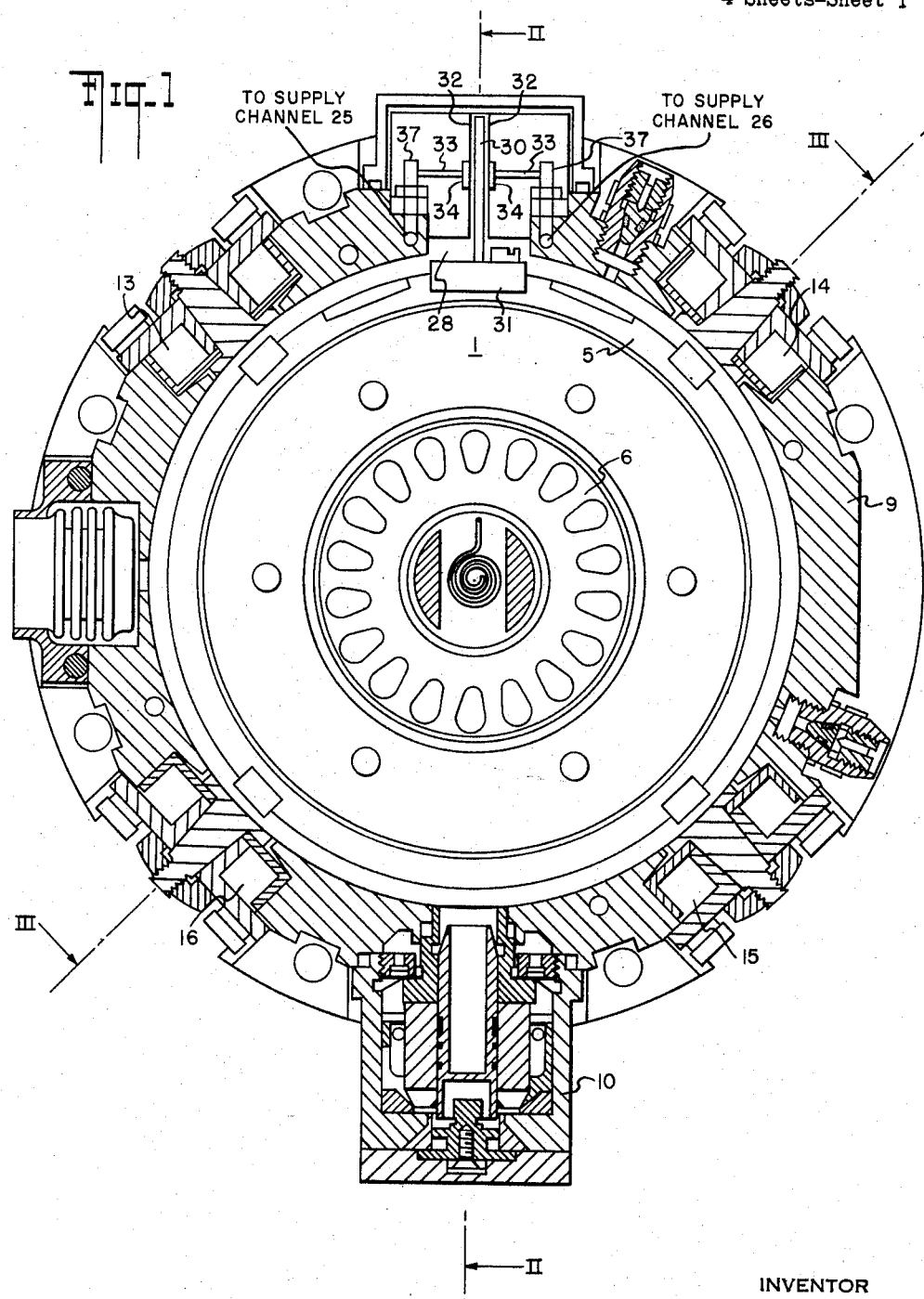
Fig. 1 is a view of the gyroscope sectioned on a plane perpendicular to the rotor axis and passing through its centre.
Figure 2:
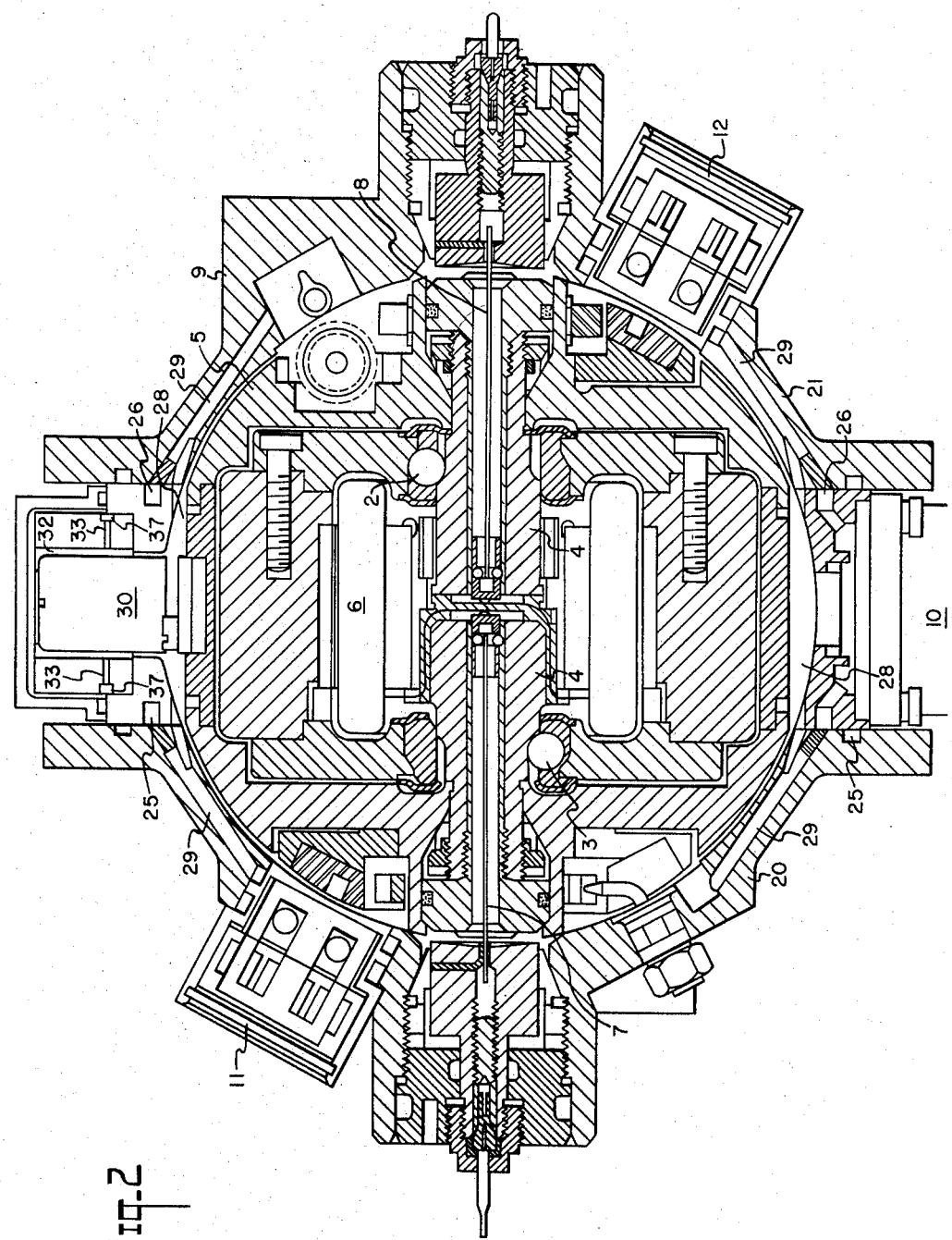
Fig. 2 is a view of the gyroscope, sectioned on the line II—II of Fig. 1.

Referring particularly to Figs. 1 and 2, the gyroscope comprises a rotor 1 supported from ball bearings 2, 3 carried on a tubular shaft member 4 which is secured at its ends in a generally spherical totally sealed rotor bearing case 5. The shaft member 4 also carries at its centre an electrical stator 6 for driving the rotor, and electrical power is carried to the stator by way of insulating conducting ligaments 7 and 8 arranged according to the manner described in the specification of U.S. patent application Serial No. 629,419.

The rotor and rotor bearing case are made largely of sintered heavy-metal alloy so as to have a mean density equal to that of mercury. Mercury is used to support the rotor, the mercury being contained in, and filling an outer container 9 which is intended to be controlled to follow the movements of the rotor case, so that any relative angular displacement of the bearing case 5 and container 9 is kept very small during the operation of the instrument.

In a manner to be described subsequently, the rotor bearing case 5 is maintained central within the container 9 and also prevented from rotating with respect to the container about the rotor axis, by a flow of the mercury, the mercury being circulated by means of a pump 10. The flow of mercury does not oppose angular motion of the rotor bearing case with respect to the container about any axis perpendicular to the rotor axis. Thus the gyroscope is of the kind in which the rotor bearing case is said to have two degrees of freedom.

A pair of pick-offs 11 and 12 (Figure 2) constructed according to the manner described in the specification of U.S. patent application Serial No. 713,068 provide error signals in response to components of angular displacement of the rotor bearing case 5 with respect to the container 9 about an axis perpendicular to the rotor axis and perpendicular to the plane of Figure 2. A similar pair of pick-offs are arranged on a plane through the rotor axis perpendicular to the plane of Figure 2, and provide error signals in response to components of angular displacement of the rotor bearing case about an axis perpendicular to the rotor-axis and lying in the plane of Figure 2. The error signals from these pairs of pick-offs control servo motors (not shown) which move the container 9 angularly in a manner tending to maintain a fixed angular relation between bearing case 5 and container 9.

The gyroscope is provided with four electromagnetic torque motors 13, 14, 15 and 16, of which 13 and 15 are arranged to exert appropriate precessing torques on the rotor bearing case 5 about one axis perpendicular to the rotor axis, while 14 and 16 are arranged to exert precessing torques about an axis perpendicular to both the other two axes. Each torque motor operates on an adjacent one of four permanent magnets 17 which are secured to the rotor bearing case 5.

Figure 3:
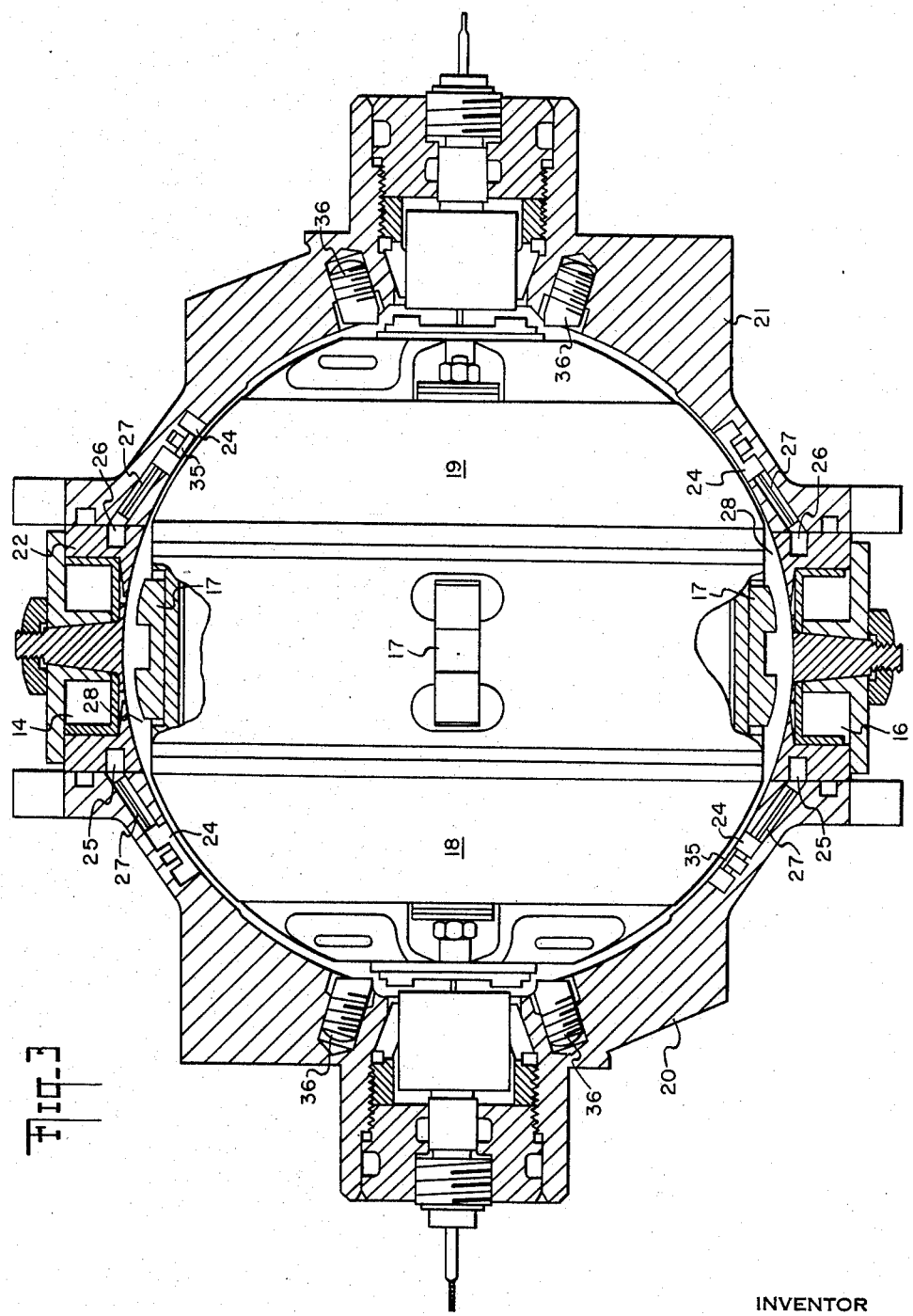
Fig. 3 is a view of the gyroscope showing the rotor bearing case, the outer casing being sectioned on the line III—III of Fig. 1.
Figure 4:
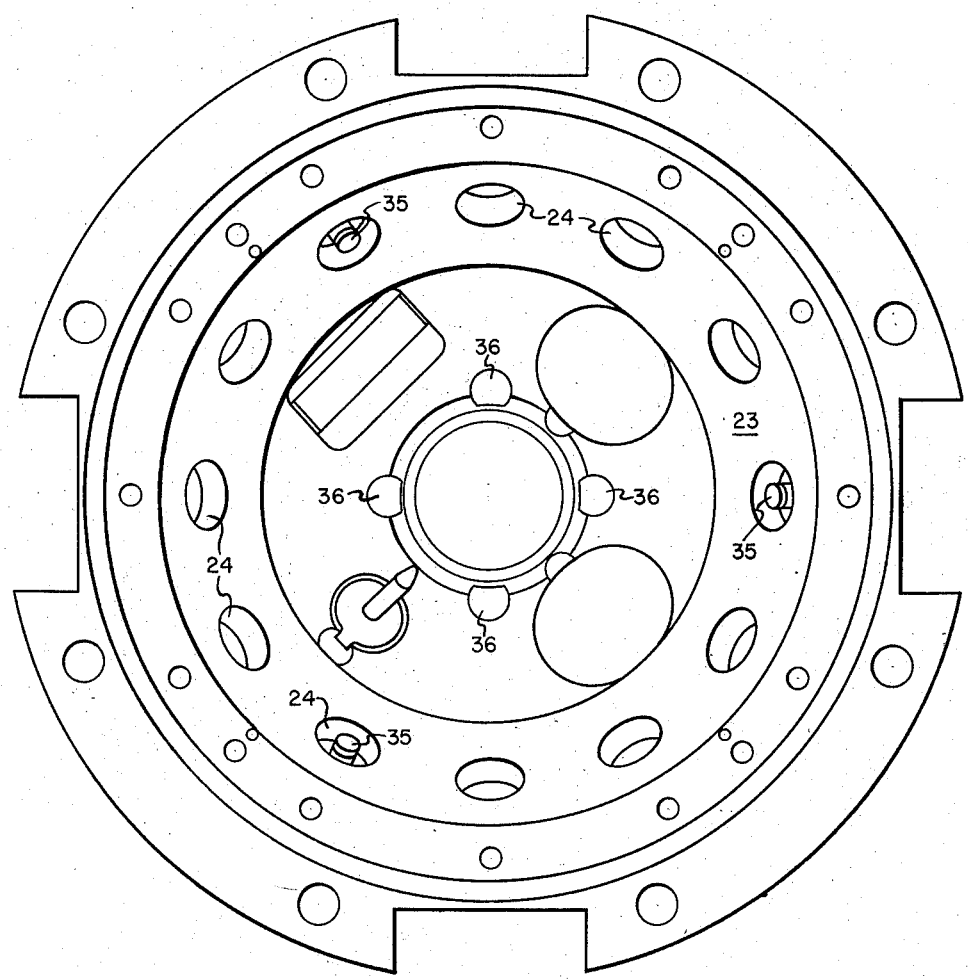
Fig. 4 shows the inner surface of an end portion of the outer casing, seen from the viewpoint of Fig. 1.

Referring now to the manner in which the rotor bearing case is located by the flow of mercury, the rotor bearing case 5 provides two pressure zones 18 and 19 (Fig. 3) which conform precisely to the surface of a sphere. Corresponding zones are provided by the outer casing or container 9, but these depart from truly spherical surfaces in that they contain pockets. The outer casing includes three parts; two end caps 20 and 21 and an intermediate member 22 interposed between end caps 20 and 21. Fig. 4 shows a view from within of end cap 20, showing a zone 23 which fits over pressure zone 18 with a very small clearance over the greater part of its area.

Within the zone 23, and a similar zone provided by the end cap 21, are twelve rather shallow pockets 24. These are supplied with mercury from the pump 10. The pump supplies mercury under pressure to two main channels 25 and 26 cut around the outwardly facing surfaces of the intermediate member 22 of the container and closed by the end caps. (Figs. 2 and 3.) The pockets 24 are supplied from channels 25 and 26 through passages containing restrictions 27, which restrictions may conveniently be formed from lengths of steel tube as used for hypodermic needles. Due to the effect of these restrictions, change in the rate of flow of mercury from the pockets causes appreciable changes in pressure in the pockets.

The shape of the rotor bearing case 5 between the pressure zones 18 and 19 is more nearly cylindrical than spherical, while the container cavity is approximately spherical in the same region. Consequently a generally annular passage 28 exists between the rotor bearing case 5 and the container 9. The mercury flowing out of the pockets flows into passage 28 either directly, or by way of pressure equalising ducts 29 and thence passes into the suction side of the pump.

The action of the mercury flow into the pockets 24 is to keep the rotor case central in the container. The rotor bearing case is balanced by flotation forces which themselves suspend the rotor case and counteract very exactly gravity and acceleration forces acting on the rotor bearing case. However, very small residual forces, arising from slight irregularities between the gravity and acceleration forces and the flotation forces, would produce relative translation between the rotor case and the container when the container is subject to accelerations. Such relative translation tends to vary the gaps between the rotor bearing case and the outer container, thus tending to produce pressure changes in the pockets 24 which maintain the rotor bearing case substantially central. Accordingly, the centralizing means provided maintains the case at a normal clearance with respect to the container about its axes of freedom while providing a continuous flow of liquid in the clearance between the zonal areas of the elements. Such means also includes passageways or passages in the container connecting with symmetrically arranged pockets in the container zonal area and pressure means supplying supporting liquid through the passageways and pockets at unbalanced equalizing pressures when the case and container depart from normal clearance conditions and at equalized pressures upon restoration of the normal clearance condition. One of the spaced zonal areas of the case is above the center of gravity thereof and the other is below the center of gravity.

Damping of translatory movement of the rotor bearing case relative to the container is obtained automatically by virtue of the viscous resistance to the flow of mercury in the small clearance between the pressure zones of the rotor bearing case and the inner surface of the container. The clearance between the pressure zones of the rotor bearing case and the corresponding zones of the container, excluding the pockets of course, is .003 inch.

Rotation of the rotor bearing case about the axis of rotor 1 is prevented by a locating vane 30 seen in Figs. 1 and 2. This vane lies in a meridian plane of the rotor case (that is to say, a plane containing the spin axis of the rotor) and has its central axis directed radially outwards from the rotor bearing case at right angles to the spin axis of the rotor, so that angular motion of the rotor bearing case about the spin axis would cause the vane to move broadside on through the mercury. The vane 30 has the form of a relatively narrow blade or spade formed on a cylindrical boss 31 by machining from an originally solid cylinder; it extends angularly in the meridian plane of the rotor case through approximately 10° on each side of the equatorial plane of the rotor axis. The cylindrical boss 31 extends outwardly into a circular hole in the outer container, the vane itself extending outwardly into a narrow slot in a vane chamber 32 that is mounted on the container to constitute an extension of the container. The walls of the slot are parallel to the plane of the vane, and the vane normally lies in the centre of the slot with very small clearance (.004 inch) on both faces.

The vane 30 is kept in the central plane of the slot by equalizing pressures due to the flow of mercury in a manner similar to that by which the rotor bearing case as a whole is kept central in the container. Mercury from the main supply channels 25 and 26 is supplied through passages 37, Fig. 1, and restrictions 33 to pockets 34 symmetrically arranged one in each wall of the slot and opposite the central axis of the vane. Mercury escapes from the pockets 34 into the narrow spaces between the walls of the vane and the walls of the vane chamber, and passes thence to the passage 28 and returns to the pump.

The pressures due to the flow of mercury into the vane chamber become unbalanced when the vane 30 departs from a normal clearance condition between the opposed pockets 34, and thus exercise a centralising force on the vane, whereby the rotor bearing case is located relatively to the container substantially in a fixed angular position about the spin axis. Any angular oscillations of the rotor bearing case about the spin axis are heavily damped by viscous resistance to the resulting oscillatory flow of mercury between the vane and the walls of the vane chamber.

The described manner of locating the rotor case against rotation about the spin axis of the gyroscope, nevertheless freely permits two degrees of freedom of angular motion of the rotor bearing case relative to the container. Any relative angular displacement of the rotor bearing case can be resolved into a component about an axis perpendicular to the plane of vane 30 and a component about an axis passing through the vane perpendicular to the spin axis of the rotor. The first of these two components of motion is accompanied by an angular motion of the vane in its own plane, which remains parallel to the central plane of the slot in which it lies. The other component of motion causes the vane to turn with the rotor case about the central axis of the vane, and its plane becomes inclined to the plane of the slot through a small angle.

Owing to the very small clearance between the pressure zones of the rotor bearing case and the corresponding zones of the container, there would be some risk of adjacent surfaces becoming stuck together when the gyroscope is out of operation and the pump is no longer circulating mercury. To prevent this occurring, three of the twelve pockets 24 in each end cap of the container are provided with stops 35 (Figs. 3 and 4) which project very slightly beyond the spherically formed surfaces containing the pockets, so ensuring that a film of mercury is always maintained between the pressure zones and the corresponding zones of the container.

Further, adjustable stops 36, also seen in Figs. 3 and 4 are provided by the container to limit the amount of relative angular displacement which can occur about the axes of freedom between the rotor bearing case and the container. Each end cap of the container provides four such stops surrounding the rotor axis. In normal operation of the gyroscope the servo motor always maintains the range of relative angular displacement between the bearing case and container less than the range of relative movement allowed by the stops 36. By limiting the possible range of movement between the bearing case and container, the stops 36 protect the conducting ligaments 7 and 8 and also limit the demands which may be made upon the servo motors when the gyroscope is started up.

What is claimed is:

1. A gyroscope having a rotor with an axis, a container having an inner zonal area provided by a surface of revolution about the rotor axis, a rotor bearing case having a zonal area substantially conforming to the zonal area of the container, a liquid supporting the case within the container in buoyant condition with freedom about axes perpendicular to the rotor axis and with a normal clearance between the surfaces of the elements at the respective zonal areas thereof, means for centralizing said case at the normal clearance with respect to the container providing a continuous flow of liquid in the clearance between the zonal areas including passageways in said container connecting with symmetrically arranged pockets in the container zonal area and pressure means supplying supporting liquid through the passageways and pockets at unbalanced equalizing pressures when the case and container depart from normal clearance conditions and at equalized pressures upon restoration of the normal clearance condition, and means for preventing rotation of the buoyantly supported case with respect to the container about the axis of the rotor having opposed pockets in said container connecting with said pressure means.

2. A gyroscope as claimed in claim 1, in which the zonal areas of the case and container have two parts one of which is above and the other of which is below the center of gravity of the case and rotor.

3. A gyroscope as claimed in claim 1, in which the surfaces of the zonal areas of the case and container are spherical.

4. A gyroscope as claimed in claim 1, in which the surface of the zonal area of the case is spherical, and the center of gravity of the case and rotor is coincident with the center of the spherical surface.

5. A gyroscope as claimed in claim 1, in which corresponding restrictions are included in the passageways to the pockets in the zonal area of the container.

6. A gyroscope as claimed in claim 1, in which the pockets in the zonal area of the container are located at the same radial distance from the axis of the rotor.

7. A gyroscope as claimed in claim 1, in which the rotation preventing means includes a vane on the case extending radially from the axis of the rotor, and said container includes a chamber with the opposed pockets connecting with passageways to the liquid supplying pressure means providing balanced pressures on the respective sides of the vane under a normal clearance condition between the chamber and the vane and equalizing pressures under other than normal clearance conditions.

8. A gyroscope as claimed in claim 1, in which the container includes a plurality of stops that engage the surface of the case at a portion thereof other than the zonal area to limit the relative freedom between the case and container.

9. A gyroscope as claimed in claim 1, in which the container includes a plurality of stops projecting from the pockets thereof that contact the zonal area surface of the case to prevent the surface from engaging the corresponding zonal area surface of the container.

10. In a gyroscope, a rotor with an axis, a container having an inner zonal area provided by a surface of revolution about the rotor axis, a rotor bearing case having a zonal area substantially conforming to the zonal area of the container, a liquid supporting the case within the container in buoyant condition with freedom about axes perpendicular to the rotor axis and with a normal clearance between the surfaces of the elements at the respective zonal areas thereof, and means for centralizing said case at the normal clearance with respect to said container about said freedom axes providing a continuous flow of liquid in the clearance between the zonal areas including passageways in said container connecting with symmetrically arranged pockets in the container zonal area and pressure means supplying supporting liquid through the passageways and pockets at unbalanced equalizing pressures when the case and container depart from normal clearance conditions and at equalized pressures upon restoration of the normal clearance condition.

11. A gyroscope as claimed in claim 8, including means for preventing rotation of the buoyantly supported case with respect to the container having opposed pockets in said container connecting with said pressure means.

12. A gyroscope as claimed in claim 10, in which the container includes a plurality of stops that engage the surface of the case at a portion thereof other than the zonal area to limit the relative freedom between the case and container.

13. A gyroscope as claimed in claim 10, in which the container includes a plurality of stops projecting from the pockets thereof that contact the zonal area surface of the case to prevent the surface from engaging the corresponding zonal area surface of the container.

References Cited in the file of this patent

UNITED STATES PATENTS

| | | |
|---|---|---|
| 1,445,279 | Henderson | Feb. 13, 1923 |
| 1,501,886 | Abbot | July 15, 1924 |
| 2,133,809 | Carter et al. | Oct. 18, 1938 |
| 2,617,695 | Tauscher et al. | Nov. 11, 1952 |
| 2,618,159 | Johnson et al. | Nov. 18, 1952 |
| 2,695,199 | Blizard | Nov. 23, 1954 |
| 2,734,280 | Christoph | Feb. 14, 1956 |